US012695503B2

(12) United States Patent
Ogorodnikov et al.

(10) Patent No.: US 12,695,503 B2
(45) Date of Patent: Jul. 28, 2026

(54) SYSTEM FOR EXTENDING VEHICLE WI-FI RANGE

(71) Applicant: FORD GLOBAL TECHNOLOGIES, LLC, Dearborn, MI (US)

(72) Inventors: Dmitry Ogorodnikov, Amherstburg (CA); Steven Anthony Chapekis, Escanaba, MI (US); Harald Christian Martinez, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 566 days.

(21) Appl. No.: 18/117,766

(22) Filed: Mar. 6, 2023

(65) Prior Publication Data

US 2024/0305366 A1     Sep. 12, 2024

(51) Int. Cl.
| | |
|---|---|
| *H04B 7/26* | (2006.01) |
| *H04B 7/185* | (2006.01) |
| *H04W 28/02* | (2009.01) |

(52) U.S. Cl.
CPC ........... *H04B 7/26* (2013.01); *H04B 7/18502* (2013.01); *H04W 28/0226* (2013.01)

(58) Field of Classification Search
CPC .. H04B 7/26; H04B 7/18502; H04W 28/0226
USPC ........................................................ 370/315
See application file for complete search history.

(56) References Cited

U.S. PATENT DOCUMENTS

| | | | |
|---|---|---|---|
| 6,061,562 A | 5/2000 | Martin et al. | |
| 6,925,378 B2 | 8/2005 | Tzamaloukas | |
| 8,457,546 B2 | 6/2013 | Mahajan et al. | |
| 9,967,718 B2 | 5/2018 | Feng et al. | |
| 9,984,347 B2 | 5/2018 | Dreano, Jr. | |
| 10,474,904 B1 * | 11/2019 | Correnti | G06V 20/52 |
| 10,521,954 B2 | 12/2019 | Holzer et al. | |
| 10,659,998 B2 | 5/2020 | Cabral et al. | |
| 10,679,071 B2 | 6/2020 | Anderson et al. | |
| 10,810,798 B2 | 10/2020 | Espeset et al. | |
| 10,965,757 B2 | 3/2021 | McCann et al. | |
| 11,113,953 B2 | 9/2021 | Badger, II | |
| 11,363,355 B2 | 6/2022 | Balakrishnan et al. | |
| 11,604,463 B1 * | 3/2023 | Trivedi | G05D 1/0217 |
| 11,923,954 B1 * | 3/2024 | Nagelberg | H04N 7/185 |
| 2003/0224787 A1 * | 12/2003 | Gandolfo | H04W 52/46 |
| | | | 455/435.2 |

(Continued)

FOREIGN PATENT DOCUMENTS

| | | |
|---|---|---|
| CN | 110574351 A | 12/2019 |
| WO | 2018211488 A1 | 11/2018 |

*Primary Examiner* — Faisal Choudhury

(74) *Attorney, Agent, or Firm* — David B. Kelley; Brooks Kushman P.C.

(57) ABSTRACT

A wireless network having a plurality of nodes include a main device at a starting location and configured to operate as a starting node; and a plurality of node devices serving as communication relays and connected in series forming a connection branch, the plurality of node devices including a first node device configured to deploy to a first location at a first distance from the starting location and wirelessly connect to the main device, and a second node device configured to deploy to a second location at a second distance from the first location and wirelessly connect to the first node device, wherein the second distance is shorter than the first distance.

16 Claims, 5 Drawing Sheets

(56) References Cited

U.S. PATENT DOCUMENTS

| | | | |
|---|---|---|---|
| 2012/0038489 A1* | 2/2012 | Goldshmidt | G08G 1/166 |
| | | | 340/902 |
| 2014/0019301 A1 | 1/2014 | Meadow et al. | |
| 2020/0275245 A1* | 8/2020 | Haubner | H04W 88/04 |
| 2021/0237646 A1 | 8/2021 | Schondorf et al. | |
| 2021/0345072 A1 | 11/2021 | Selvanesan et al. | |
| 2023/0121724 A1* | 4/2023 | Salsbury | H04W 4/024 |
| | | | 701/36 |
| 2025/0109964 A1* | 4/2025 | Sakai | G01C 21/3841 |

* cited by examiner

100

200

300

400

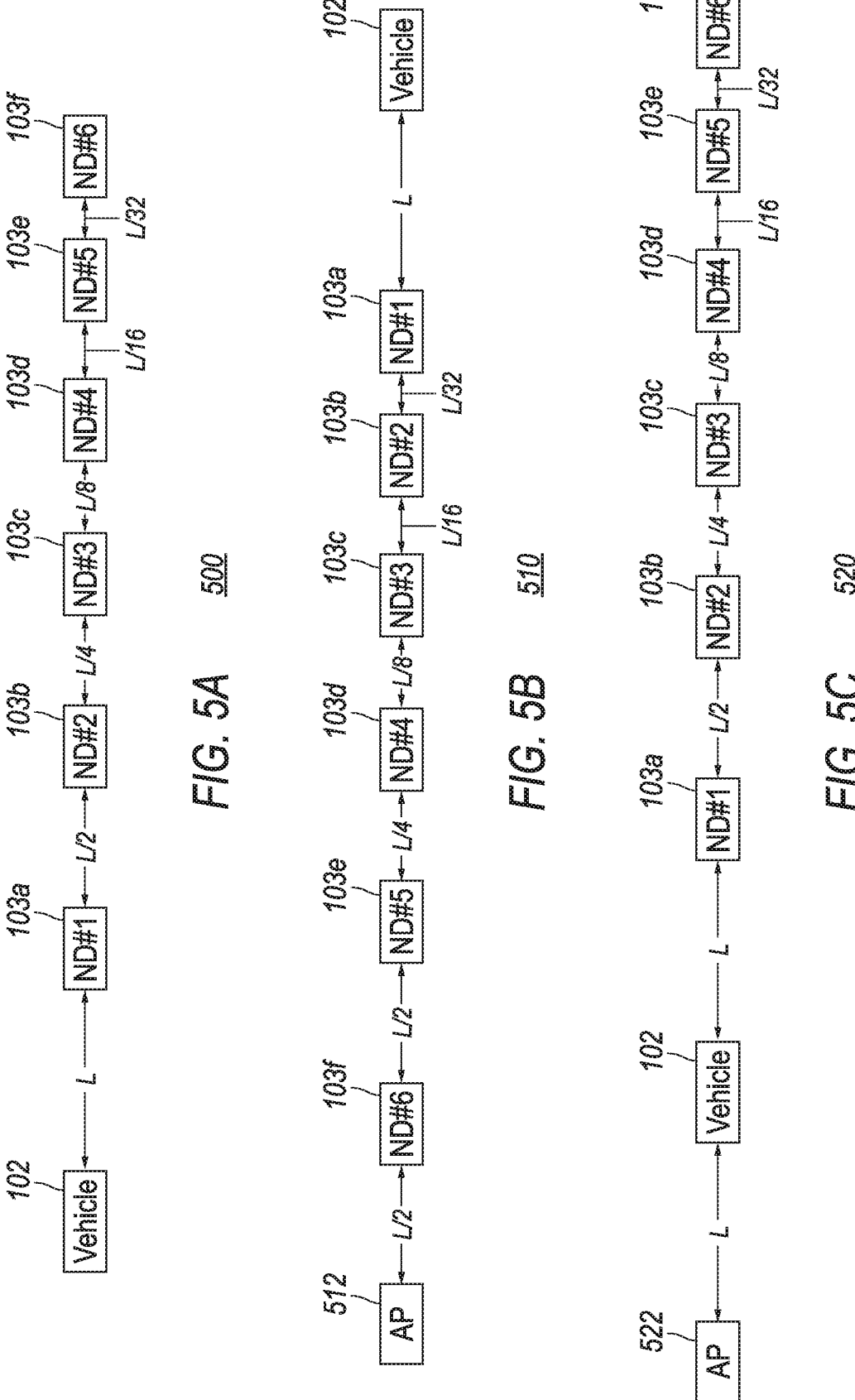
*FIG. 5A*    500
*FIG. 5B*    510
*FIG. 5C*    520

SYSTEM FOR EXTENDING VEHICLE WI-FI RANGE

TECHNICAL FIELD

The present disclosure generally relates to a system for extending wireless communication range. More specifically, the present disclosure relates to a system for extending a range of a Wi-Fi network involving a vehicle.

BACKGROUND

Vehicles may be provided with wireless connectivity features such as Wi-Fi and cellular connections. Although Wi-Fi data may be generally cheaper in price compared with cellular data, the connection range of Wi-Fi signals may be more limited.

SUMMARY

In one or more illustrative examples of the present disclosure, a wireless network having a plurality of nodes include a main device at a starting location and configured to operate as a starting node; and a plurality of node devices serving as communication relays and connected in series forming a connection branch, the plurality of node devices including a first node device configured to deploy to a first location at a first distance from the starting location and wirelessly connect to the main device, and a second node device configured to deploy to a second location at a second distance from the first location and wirelessly connect to the first node device, wherein the second distance is shorter than the first distance.

In one or more illustrative examples of the present disclosure, a wireless communication system includes a plurality of node devices each serving as a node and connected in series forming a connection branch, the plurality of node devices including: a first node device configured to deploy to a first location at a first distance from a starting location and wirelessly connect to a main device located at the starting location, a second node device configured to deploy to a second location at a second distance from the first location and wirelessly connect to the first node device, wherein the second distance is shorter than the first distance, and a third node device configured to deploy to a third location at a third distance from the second location and wirelessly connect to the second node device, wherein the third distance is shorter than the second distance.

In one or more illustrative examples of the present disclosure, a vehicle includes a wireless transceiver configured to communicate with one or more of a plurality of node devices provided with moving capability; and one or more controllers, programmed to: responsive to arriving at a parking location, command a first node device of the plurality of node devices to deploy to a first location at a first distance from a parking location, and command a second node device of the plurality of node devices to deploy to a second location at a second distance from a first location, wherein the second distance is shorter than the first distance.

BRIEF DESCRIPTION OF THE DRAWINGS

For a better understanding of the invention and to show how it may be performed, embodiments thereof will now be described, by way of non-limiting example only, with reference to the accompanying drawings, in which:

FIG. 5A illustrates an application of the wireless communication network of the present disclosure.

FIG. 5B illustrates another application of the wireless communication network of the present disclosure.

FIG. 5C illustrates yet another application of the wireless communication network of the present disclosure.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, discloses a wireless communication network. More specifically, the present disclosure proposes a system for extending a range of a Wi-Fi network involving a vehicle.

Figure 1:
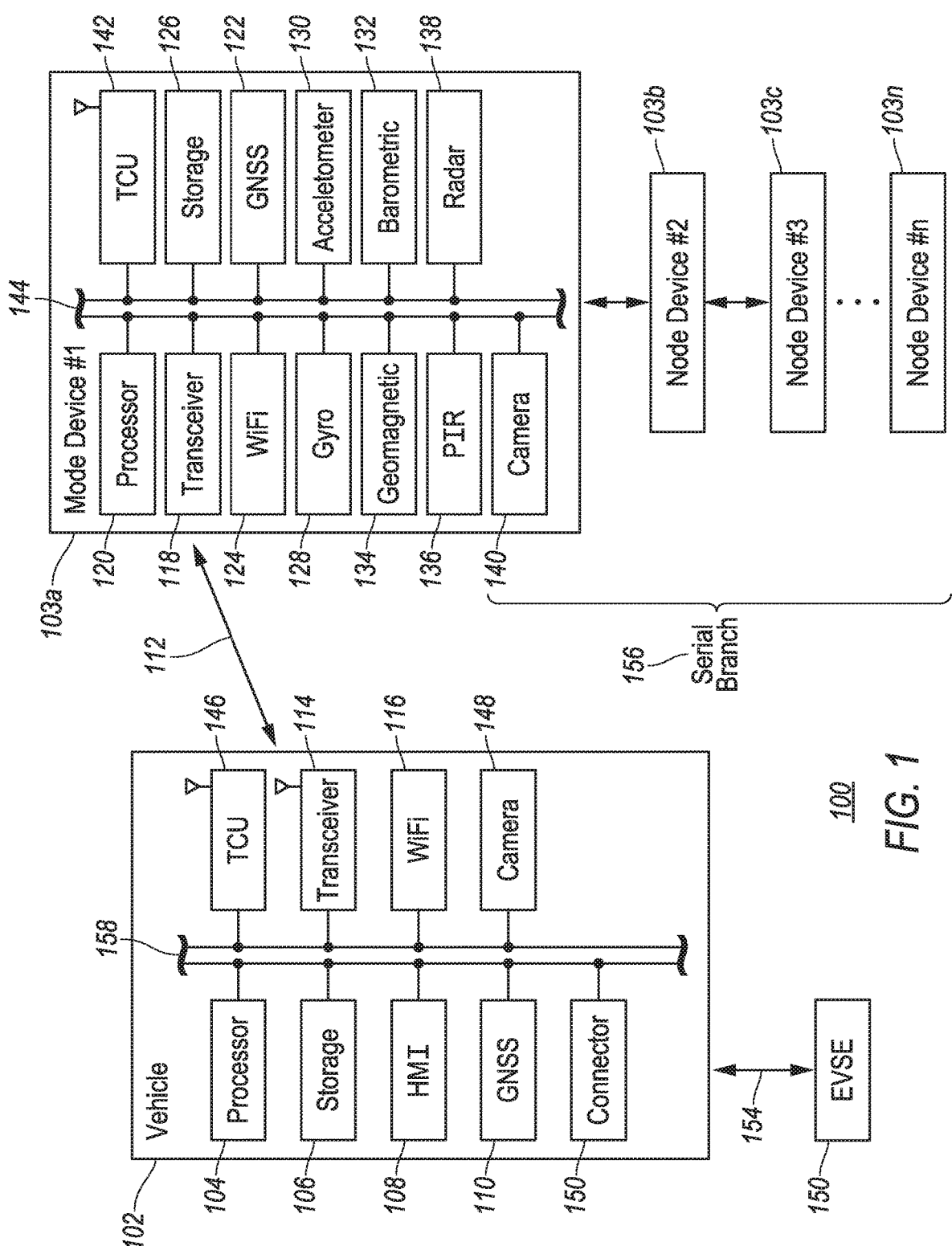
FIG. 1 illustrates an example block topology of a wireless connection network of one embodiment of the present disclosure.

Referring to FIG. 1, an example block topology of a wireless communication system 100 involving a vehicle 102 of one embodiment of the present disclosure is illustrated. The wireless communication network 100 may include a plurality of connected nodes configured to receive and send data one node to another. More specifically, the wireless communication network 100 may include a vehicle 102 and a plurality of node devices 103. The vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a battery electric vehicle (BEV), a hybrid electric vehicle (HEV) powered by both an internal combustion engine and one or move electric motors, such as a series hybrid electric vehicle (SHEV), a plug-in hybrid electric vehicle (PHEV), a parallel/series hybrid vehicle (PSHEV), or a fuel-cell electric vehicle (FCEV), a boat, a plane or other mobile machine for transporting people or goods. It should be noted that the illustrated wireless communication network 100 is merely an example, and more, fewer, and/or differently located elements may be used.

As illustrated in FIG. 1, the vehicle 102 may include one or more processors 104 configured to perform instructions, commands, and other routines in support of the processes described herein. For instance, the vehicle 102 may be configured to execute instructions of vehicle applications (e.g. software programs) to provide features such as navigation, wireless communication, autonomous driving. Such instructions and other data may be maintained in a non-volatile manner using a variety of types of computer-readable storage medium 106. The computer-readable medium (also referred to as a processor-readable medium or storage) may include any non-transitory medium (e.g. tangible medium) that participates in providing instructions or other data that may be read by the processor 104 of the vehicle 102. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and structured query language (SQL).

The vehicle 102 may be provided with various features allowing the vehicle users to interface with the vehicle 102. For example, the vehicle 102 may receive input from human machine interface (HMI) controls 108 configured to provide for user interaction with the vehicle 102. As an example, the vehicle 102 may interface with one or more buttons, switch, touch screen device, voice-activated device or other HMI controls configured to invoke functions on the vehicle 102.

The vehicle 102 may also be provided with navigation features using location data determined by a global navigation satellite system (GNSS) controller 110. The GNSS controller 110 may be configured to communicate with multiple satellites and calculate the location of the vehicle 102. The GNSS controller 110 may be configured to support various current and/or future global or regional location systems such as global positioning system (GPS), Galileo, Beidou, Global Navigation Satellite System (GLONASS) and the like.

The vehicle 102 may be configured to wirelessly communicate with one or more node devices 103 via a wireless connection 112. The node devices 103 may include a variety of devices provided with wireless communication capability and configured to extend the communication range of the wireless communication network 100. Each node device 103 may operate as a single node of the wireless communication network 100. In one example, the node devices 103 may include a plurality of individual devices provided with moving features (e.g. capability to move) to adjust the location of each node device 103 such that the signal coverage of the wireless communication network 100 may be optimized. As a few non-limiting examples, the node devices 103 may be implemented via aerial devices, robots or the like. Alternatively, the node devices 103 may be at predefined fixed locations without the mobility feature.

The vehicle 102 may include a wireless transceiver 114 configured to establish the wireless connection 112 and communicate with the node devices 103. The wireless transceiver 114 may be in communication with a Wi-Fi controller 116 and configured to communicate with a compatible wireless transceiver 118 of the node device 103. Additionally, the wireless transceiver 114 may be configured to support other communication protocols for the wireless connection 112. As a few non-limiting examples, the wireless transceiver 114 may be further configured to communicate with the node device 103 via one or more of the following types of communication protocols: BLUETOOTH, radio-frequency identification (RFID), near-field communication (NFC), Zigbee, IrDA or the like. Additionally, the vehicle 102 may further communicate with one or more user devices (not shown) as part of the wireless communication network 100 via the wireless transceiver 114. The user device may be any of various types of portable computing devices, such as cellular phones, tablet computers, wearable devices, smart watches, laptop computers, portable music players, or other device capable of communication with the wireless transceiver 114.

The node devices 103 may be provided with various components to and configured to perform operations of the wireless communication network 100. Each of the node devices may be configured in a similar manner. Taking a first node device 103a for instance, the first node device 103a may be provided with a processor 120 configured to perform instructions, commands, and other routines in support of the processes such wireless communication, and mobility. For instance, the first node device 103a may be provided with location features via a GNSS controller 122. The first node device 103 may be provided a wireless transceiver 118 in communication with a Wi-Fi controller 124 and configured to communicate with the wireless transceiver 114 of the vehicle 102. Similarly, the wireless transceiver 118 of the first node device 103 may be further configured to support other communication protocols. As a few non-limiting examples, the wireless transceiver 118 may be further configured to communicate with the node device 103 via one or more of the following types of communication protocols: BLUETOOTH, RFID, NFC, Zigbee, IrDA or the like.

The first node device 103a may be further provide with a non-volatile storage 126 to store various applications and data. The first node device 103a may be further provided with various sensors to facilitate the mobility operations. As discussed above, the first node device 103a may be provided with moving features (e.g., in the form of an aerial device), which are enabled and facilitated by various sensors. For instance, the first node device 103a may be provided with a gyroscope sensor 128 configured to measure the orientation of the first node device 103a. The first node device 103a may be further provided with an accelerometer 130 configured to measure an change in speed of the first node device 103a. The first node device 103a may be further provided with a barometric sensor 132 configured to measure the altitude of the first node device 103a. The first node device 103a may be further provided with a geomagnetic sensor 134 configured to measure a magnetic field and determine the direction of the first node device 103a. The first node device 103a may be further provided with a passive infrared (PIR) sensor 136 configured to detect objects by measuring infrared light radiating from objects. The first node device 103a may be further provided with a radar sensor 138 configured to detect objects by emitting radar signals and measuring reflections from the objects. The radar sensor 138 may be implemented in a variety of manners. For instance, the radar sensor 138 may include an ultrasonic sensor, and laser sensor. Additionally the first node device 103a may be provided with a lidar sensor operated under essentially the similar concept. The first node device 103 may be further provided with a camera 140 configured to capture images. The images may be analyzed by the processor 120 to facilitate object detection and mobility navigation. Additionally, the images may be transferred to other entities of the wireless communication network 100 (e.g., to the vehicle 102 or other node devices 103).

The first node device 103a may be further provided with a telematics control unit (TCU) 142 configured to connect the first node device 103a with a wide area network (WAN) such as a cellular network (not shown). The TCU 142 may be used when a wireless local area network (WLAN) (e.g., Wi-Fi) is unavailable.

An in-device network 144 may be provided and configured to facilitate the communication between the above various components of the first node device 103a. The in-device network 144 may include, but not limited to, one or more of a controller area network (CAN), an Ethernet network, and a media-oriented system transport (MOST), as some examples. Furthermore, the in-device network 144, or portions of the in-device network 144, may be a wireless network accomplished via Bluetooth low-energy (BLE), Wi-Fi, or the like.

Similar to the first node device 103a, the vehicle 102 may also be provided with a TCU 146 configured to control telecommunications between the vehicle 102 and the WAN. Since the usage of the WAN may be associated with a price, the vehicle 102 may be configured to preferably use a WLAN (e.g., Wi-Fi) whenever available and only switch to use the WAN when the local network is unavailable.

The vehicle 102 may be further provided with one or more cameras 148 configured capture images from the vehicle 102. For instance, the cameras 148 may include a dashcam located inside the vehicle cabin. The cameras 148 may include a reverse camera located outside the vehicle cabin. The cameras 148 may further include a 360-degree surrounding view camera having a plurality of camera lenses. In one example, the vehicle 102 may locate the one or more node devices 103 near by the vehicle 102 by analyzing images captured by the cameras 148.

The vehicle 102 may be further provided with a wired connector 150 configured to communicate data between the vehicle 102 and an entity. As a few non-limiting examples, the wired connection 150 may be configured to support the following data transmission protocols: universal serial bus (USB), powerline communication (PLC), Ethernet or the like. The vehicle 102 may be configured to establish a wired connection with various entities via the wired connector 150. For instance, the vehicle 102 may be configured to establish a wired connection 154 with an electric vehicle service equipment (EVSE) 152 while being refueled. In this case, the wired connector 150 may be integrated with a charging connector of the vehicle 102. The wired connection 154 may enable the vehicle 102 to access a wider range computer network (e.g. Internet) via the EVSE 152. Additionally or alternatively, the EVSE 152 may be provided with wireless communication capabilities (e.g. Wi-Fi) such that the vehicle 102 may access the wider range computer network via the wireless connection (not shown).

An in-vehicle network 158 may be provided and configured to facilitate the communication between the various components of the vehicle 102. The in-vehicle network 158 may include, but not limited to, one or more of a CAN, an Ethernet network, and a MOST, as some examples. Furthermore, the in-vehicle network 158, or portions of the in-vehicle network 144, may be a wireless network accomplished via BLE, Wi-Fi, or the like.

As illustrated in FIG. 1, the node devices 103a-n may be connected in series forming a connection branch 156. More specifically, the vehicle 102 may be in communication with a first node device 103 via the wireless connection 112. The second node device 103b may be connected to the first node device 103a. The third node device 103c may be connected to the second node device 103b. The branch may continue in the same manner. In the present example, the vehicle 102 may operate as a starting node in the connection branch/chain 156. Each node of the branch 156 may communicate with each other. For instance, the vehicle 102 operating as the starting node on one end of the connection branch 156 may communicate with the last node device #n on the other end of the branch 156 via one or more of the other node devices 103 connected in between. If any node of the communication branch 156 is provided with data access (e.g., Internet access), the data access may be extended to each node device 103 of the branch 156 such that wireless communication range may extended. It is noted that although only one connection branch 156 is connected to the vehicle 102 in the example illustrated in FIG. 1, the present disclosure is not limited thereto and the vehicle 102 may be configured to simultaneously connect to a plurality of branches 156 to facilitate different network configuration. Each branch 156 may be limited to a predefined maximum number of nodes 103 due to the data latency caused by the increased number of nodes 103. In one example, each branch 156 may be allowed to include a maximum of seven nodes (one vehicle plus six node devices).

Figure 2:
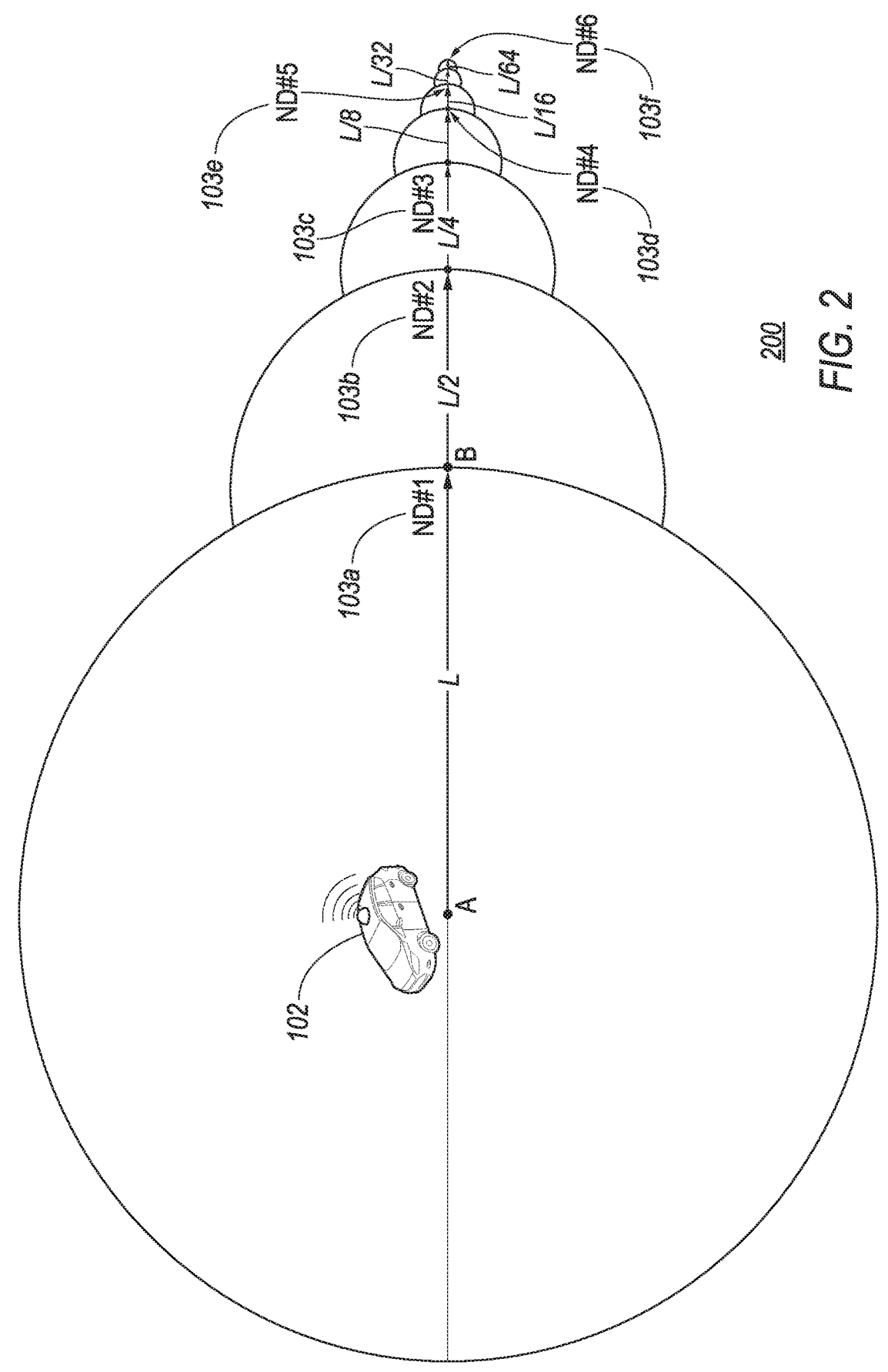
FIG. 2 illustrates a schematic diagram of the wireless communication network node arrangement of one embodiment of the present disclosure.

Referring to FIG. 2, a schematic diagram of the wireless communication network node arrangement 200 of one example of the present disclosure is illustrated. With continuing reference to FIG. 1, the network node arrangement 200 of the present example includes one vehicle 102 as the starting point and six node devices 103 connected in series. I.e., the first node device 103a may be deployed and connected to the vehicle 102. The second node device 103b may be subsequently deployed and connected to the first node device 103a and communicate with the vehicle 102 via the first node device 103a. The third node device 103c may be subsequently deployed and connected to the second node device 103b and communicate with the vehicle 102 via the first and second node device 103a, 103b. The subsequent deployment continues in the same manner until the last node device 103f is deployed. In the present example, each subsequent node may be deployed at a location that is half the distance of the immediately preceding node deployment to provide an overlap in signal coverages. Such an overlap may increase signal strength and robustness of the wireless communication network.

Referring to FIG. 2, the vehicle 102 may be located at point A as a starting point for the network node arrangement 200. Once the vehicle location as the starting node is determined, the wireless communication network may be extended by deploying the first node device 103a at point B at a distance L from point A. The distance L may be a predefined wireless connection range from the vehicle 102 within which a strong signal from the wireless transceiver 114 is anticipated (e.g. greater than −60 dBm for Wi-Fi). In general, the distance L may be shorter than the maximum connection range from the vehicle 102 supported by the wireless transceiver 114. In one example, the maximum connection range may be approximately twice the distance L, i.e. 2L. To further extend the wireless communication network, the second node device 103b may be deployed to point C which is L/2 from point B. The third node device 103c may be deployed at point D which is L/4 from point C. The fourth node device 103d may be deployed at point E which is L/8 from point D. The fourth node device 103d may be deployed at point E which is L/8 from point D. The fifth node device 103e may be deployed at point F which is L/16 from point E. The sixth node device 103f may be deployed at point G which is L/32 from point F.

Table 1 shows the distance between each node device and the vehicle in the example illustrated in FIG. 2. According to Table 1, the farthest node device (i.e. the sixth node device 103f) is approximately 1.97L from the vehicle, which effectively extends the communication range of the vehicle 102 by approximately 2L.

TABLE 1

| Distance between node devices and vehicle | | |
| --- | --- | --- |
| Device | Location | Distance from starting point (A) |
| Vehicle | A | 0 |
| Node device #1 | B | L |
| Node device #2 | C | L + L/2 = 1.5 L |
| Node device #3 | D | L + L/2 + L/4 = 1.75 L |
| Node device #4 | E | L + L/2 + L/4 + L/8 ≈ 1.88 L |
| Node device #5 | F | L + L/2 + L/4 + L/8 + L/16 ≈ 1.94 L |
| Node device #6 | G | L + L/2 + L/4 + L/8 + L/16 + L/32 ≈ 1.97 L |

It is noted that although each subsequent node distance is half of the preceding node distance in the example illustrated with reference to FIG. 2, the present disclosure is not limited thereto. In an alternative example, each subsequent node distance may be a predefined proportion of the preceding node distance under substantially the same concept.

It is further noted that although the node devices 103 are deployed in a linear manner (e.g. in a substantially straight line) in the example illustrated with reference to FIG. 2, the present disclosure is not limited thereto. In one or more alternative examples, the node devices 103 may be deployed in various formations such as a circle, triangle and/or square shape to capture images/videos around the vehicle 102. The images/videos may be transferred to the vehicle 102 and/or a cloud server to facilitate a variety of purposes such as monitoring a security perimeter, 3D view/map creation or the like.

The deployment of the node devices 103 may be implemented in various manners. As discussed above, the node devices 103 may be implemented as robots and drones provided with mobilities. Once the location of the vehicle 102 operating as the starting node is determined, the vehicle 102 may command each of the node devices 103 to deploy to the point locations as discussed above.

Figure 3:
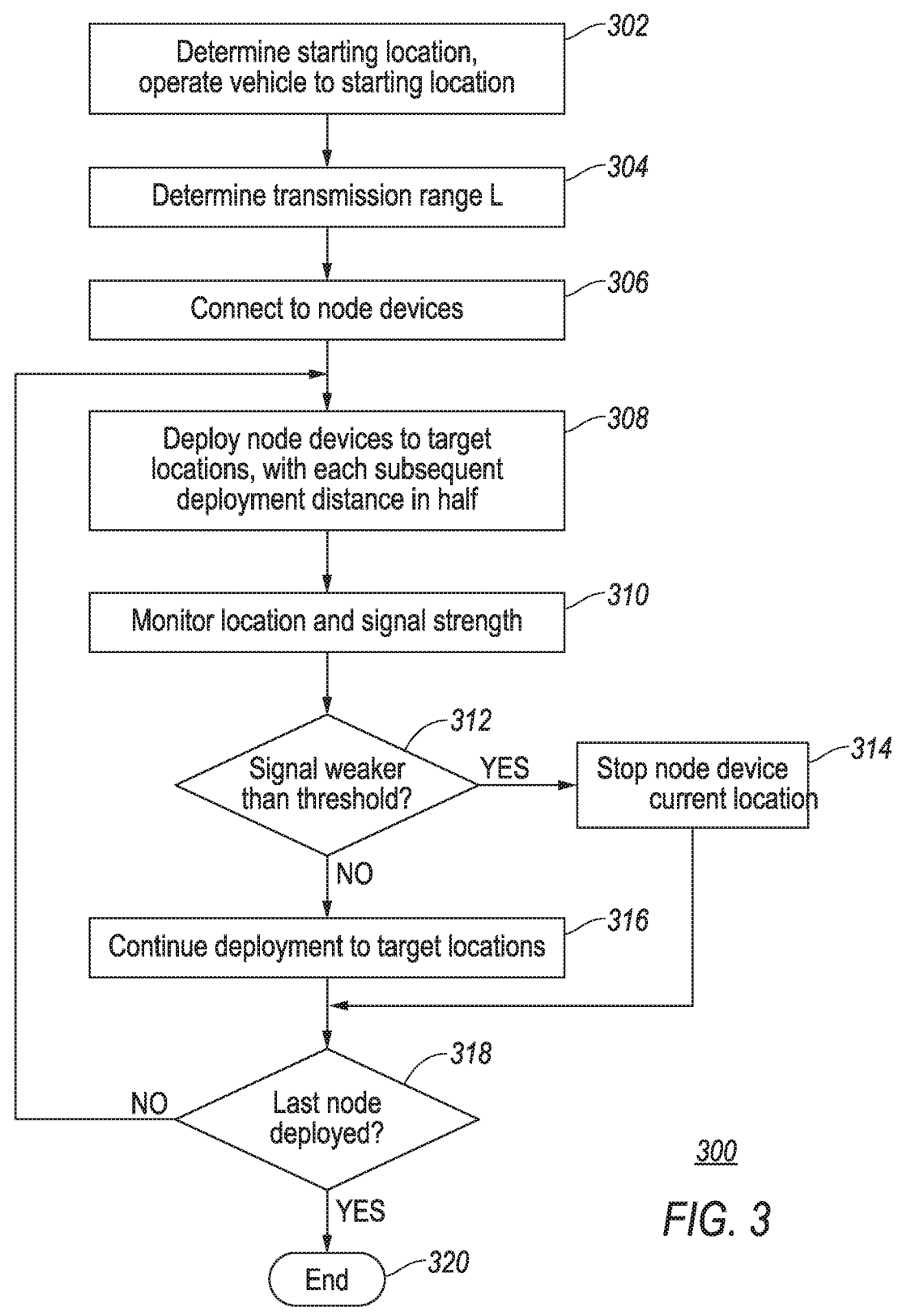
FIG. 3 illustrates an example flow diagram of a process for forming the wireless communication network node arrangement of one embodiment of the present disclosure.

Referring to FIG. 3, an example flow diagram of a process 300 for forming the wireless communication network 100 of one embodiment of the present disclosure is illustrated. With continuing reference to FIGS. 1 and 2, the process 300 may be implemented or coordinated by various entities of the wireless communication network 100. For simplicity, the following description will be made with reference to the vehicle 102 although the present disclosure is not limited thereto. At operation 302, responsive to determining a starting location for the wireless communication network 100, the vehicle 102 operates to the starting location. The starting location may be determined via a navigation destination such as a fueling infrastructure at a location eligible for the wireless communication network establishment. For instance, responsive to detecting the destination EVSE is provided with Internet access and/or node devices 103, the vehicle 102 may make an arrangement to extend the Internet access via the node devices provided with mobility features. The starting location may be determined using the destination information. If the vehicle 102 is provided with autonomous driving features, the vehicle 102 may operate to the starting location in an autonomous manner.

Once arrived at the starting location, at operation 304, the vehicle 102 determines the starting transmission range L based on the wireless transmission condition for the starting location. In general, the effective wireless transmission range of the wireless transceiver 114 may vary depending on the various factor such as signal interference of the starting location. A location with a higher level of signal interference (e.g., city) may result in a short effective wireless transmission range as compared with a location with a lower level of signal interference (e.g., countryside).

At operation 306, the vehicle 102 connects to one or more of the node devices 103 at the starting location. The node devices 103 may be associated may be associated with various entities. For instance, the node devices 103 may be associated with the destination business (e.g., fueling station) and configured to provide network coverages to various vehicles that stop at the business. Alternatively, the node devices 103 may be associated with the vehicle 102 and configured to only allow the deployment following the instructions from the vehicle 102. In either case, the vehicle 102 may connect to the node devices 103 via the wireless connection 112 through the wireless transceiver 114. In an alternative example, the initial connection between the vehicle 102 and the node devices 103 may be an indirect connection via a third party network (e.g. cellular network) through the TCU 146. Responsive to establishing the connection, the vehicle 102 may communicate with one or more of the node devices 103. At operation 308, the vehicle 102 deploys the node devices 103 to a plurality of target locations. As discussed above with reference to FIG. 2, the target location points B to G may located at varied distances, with each subsequent deployment distance being half the previous distance. In the present example, the first node device 103a may be instructed to deploy to point B which is distance L from the starting point A where the vehicle is located. As the first node devices travels toward point B (e.g. from point A), location and signal strength data may be provided to the vehicle in a real-time manner. The location data may be provided by the GNSS controller 122 of the node device 103. Alternatively, location data may be further determined through other means such as cellular data triangulation via the TCU 142. Alternatively, the vehicle 102 may determine the location of the node devices by analyzing images captured by the camera 148.

At operation 310, the vehicle 102 monitors the location and signal strength received from the first node device 103a. Depending on the specific environment of the starting location, the vehicle 102 may overestimate the starting transmission range L. That is, the signal strength may drop below a threshold before the first node device 103a arrives at the first target location point B. At operation 312, if the feedback signal indicates the signal strength is weaker than a low threshold (e.g. −60 to −67 dBm) before the from the first node device 103a arrives at point B, the process 300 proceeds to operation 314 and the vehicle 102 instructs the first node device 103a to stop at the current location where the signal strength is a the threshold without further proceeding to the target location to prevent the further weakening of the signal. In this case, the current location becomes the new target location. Otherwise, if the signal strength is above the low threshold, the vehicle 102 allows the first node device 103a to continue the deployment process and travel to the destination location point B as scheduled.

Once the first node device 103a arrives and stabilizes at the target location, the process 300 proceeds to operation 318 and the vehicle 102 verifies if the last node in the wireless communication network 100 has been deployed. The communication network 100 may include a limited number of node devices (e.g. six node devices). If all node devices have already been deployed, the process ends at operation 320. Otherwise, the process 300 returns to operation 308 to deploy the next/subsequent node device 103. Continuing with the example illustrated with referenced to FIG. 2, the second node device 103b immediately subsequent to the first node device 103a will be deployed to the next target location point C that is half the distance L from point B.

The process 300 may repeat until all the node devices 103 are deployed. As discussed above, the halving distance (or shortening distance) configuration for each subsequent node deployment may increase the network robustness in cases that one or more of the nodes encounter an issue/disconnection. Although the process 300 is discussed with reference to the vehicle 102, the present disclosure is not limited thereto. For instance, the process 300 may be implemented via other entities such as a cloud server, and/or the user device associated with the vehicle 102 under substantially the same concept.

Figure 4:
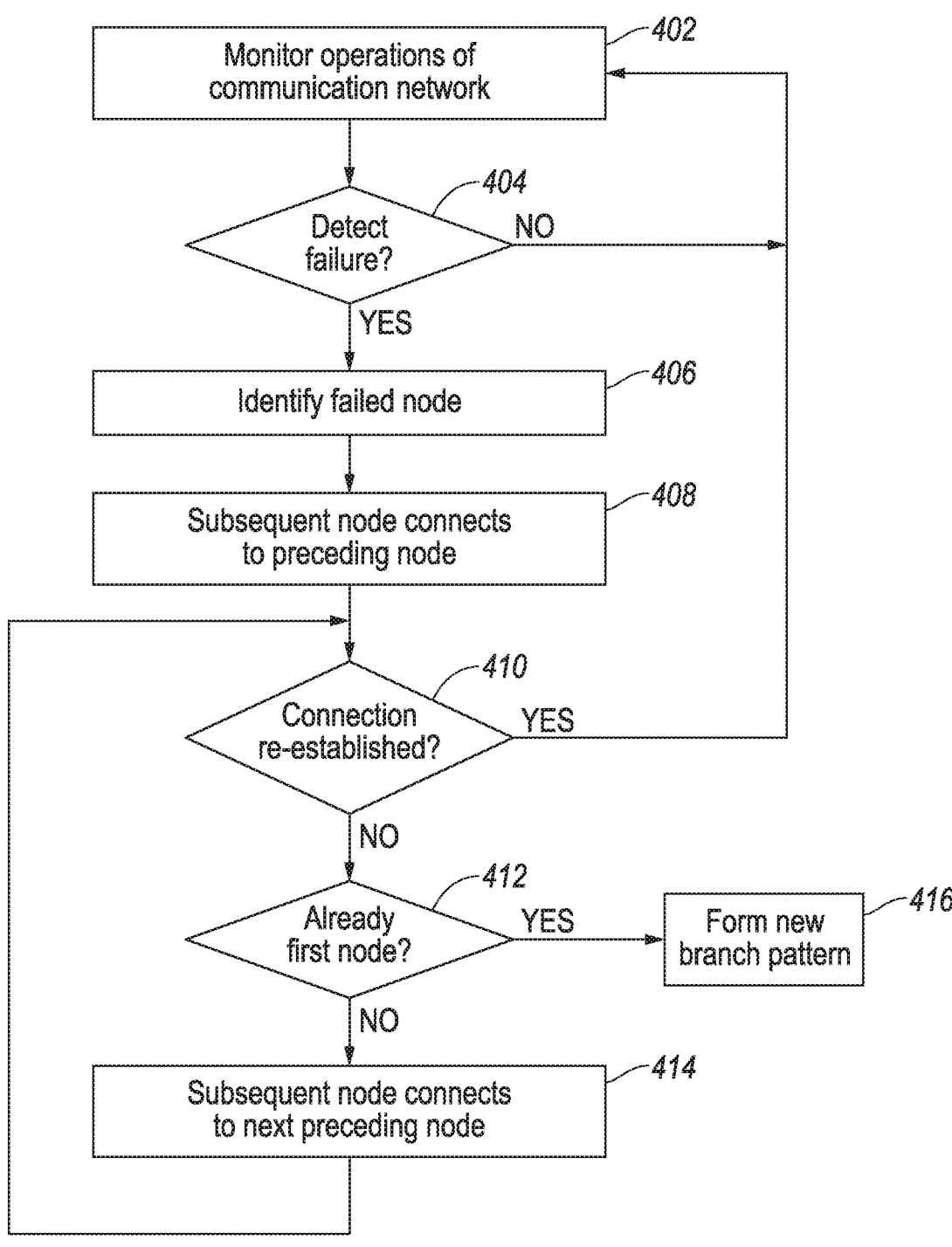
FIG. 4 illustrates an example flow diagram of a process for recovering network communication of one embodiment of the present disclosure.

Referring to FIG. 4, an example flow diagram of a process 400 for recovering from a node issue of one embodiment of the present disclosure is illustrated. With continuing reference to FIGS. 1 to 3, the process 400 may be individually or collectively performed via one or more of the node devices 103 and the vehicle 102.

At operation 402, the node devices 103 monitor the operations and data traffic of the communication network. Since each node device 103 is connected to a preceding and/or subsequent node in series, the operation of the entire wireless communication network 100 may be monitored by the data traffic between each node device.

At operation 404, responsive to detecting an issue/disconnection of the wireless communication network 100, at operation 406 the node devices 103 and the vehicle 102 identifies one or more of the node devices 103 causing the issue. For instance, a node device 103 encountering the issue may be identified as losing the wireless connection to other node devices after several recovery attempts. The node device 103 encountering the issue may use cellular networks to establish a connection to the vehicle 102 as well as other node devices 103. There may be many causes for the issue. For instance, one or more node devices 103 may encounter a signal interference and be unable to send data packages to other notes. Alternatively, given the moving nature (e.g. an aerial device/drone), one or more of the node devices 103 may be unintentionally dislocated (e.g. cause by wind) breaking the connection chain. The node device 103 may monitor and calculate the distances using various on-board sensors.

Once the node encountering the issue is detected, the process proceeds to operation 408 to recover from the issue by re-establishing the connection chain. More specifically, the connection chain may be re-established by directly connecting a preceding and a subsequent node device 103 without the involvement of the node encountering the issue. Taking the example illustrated with reference to FIG. 2 for instance, if the second node device 103b at point C encounters the issue, the third node device 103c at point D may directly connect to the first node device 103a at point B without going through the node device 103b encountering the issue. In the present example, the wireless transmission range of the wireless transceiver 118 of each node device 103 may be similar to the transmission range of the wireless transceiver 114 of the vehicle 102. Thus, the wireless transmission range of each node device 103 is not diminished or shortened by the respective position of the node in the chain. As discussed above, the maximum transmission range of the vehicle 102 (as well as of the node devices 103) may be approximately 2L which is sufficient to cover a gap caused by one or more missing node.

If the communication network 100 is successfully re-established, the process 400 returns to operation 402 from operation 410 to continue monitoring the operation of the network. Otherwise, if the subsequent node (e.g. the third node device 103c) is unable to connect to the preceding node (e.g. the first node device 103a), the process 400 proceeds to operation 412 to verify if the preceding node is already the first node of the wireless communication network 100. In the present example, the first node of the network is the vehicle 102. If the answer is no indicative of there are still other preceding nodes available, the process 400 proceeds to operation 414 and the subsequent node attempts to connect to the next available preceding node.

Continuing with the above example, if the third node device 103c is unable to connect to the first node device 103a, the third node device 103c may attempt to directly connect the next available preceding node which is the vehicle 102. The process 400 returns to operation 410 to verify if the connection may be re-established and repeats until the first node (e.g. the vehicle 102) has been reached indicative of no other preceding node is available. In this case, the process proceeds to operation 416 and the node devices 103 may change their respective locations and form a new branch pattern under the command and coordination of the vehicle 102. For instance, one or more of the node devices 103 may be instructed to move closer to the vehicle 102.

The wireless communication network 100 may be applied to various situations. Referring to FIGS. 5A-5C, schematic diagrams of different applications of the wireless communication network of different are illustrated.

More specifically, FIG. 5A illustrates an example application 500 in which a vehicle 102 to node devices 103 communication is established. With continuing reference to FIGS. 1-4, the vehicle 102 may be configured to deploy a plurality of node devices (e.g. six in the present example) to form a serial connection branch 156 in the distance halving manner described in FIGS. 2 and 3. In particular, the first node device 103a may be deployed and located at distance L from the vehicle, and each subsequent node device 103 is deployed at half the distance of the preceding deployment. Under the current configuration, the sixth node device 103f may be about 2L from the vehicle which effectively extended the wireless communication range of the vehicle 102 by 2L. Each node device 103 may be configured to allow connections to other entities (e.g. other vehicles) such that the other entities may communicate with the vehicle 102 in a wireless manner. For instance, the vehicle 102 may exchange data (e.g. a software update) with the other entities without using cellular data. Additionally, data may be exchanged between one or more of the node devices 103 and the vehicle 102. The one or more node devices 103 may capture images of the surrounding environment of the vehicle 102 via the camera 140 and transfer the images to the vehicle 102 via the connection branch 156. The vehicle may be configured to convert the images captured at different position by different node devices 103 into a 3D view for a variety of purposes such as to facilitate autonomous driving/parking.

FIG. 5B illustrates another example application 510 of the wireless communication network in which the vehicle 102 connects to a wireless network access point (e.g. Wi-Fi access point) that is located beyond the transmission range of the vehicle transceiver 114. In the present example, the vehicle 102 is about 2.5L from the access point 512 and unable to connect to the access point 512 without deploying one or more node devices to bridge the gap. The vehicle 102 may deploy the node devices 103 using the access point 512 as the starting point. The first node device 103a may be deployed to a first target location L/2 from the access point 512 and the second node device 103b may be deployed to a second target location L/2 from the first node device. Each subsequent node device 103 is deployed at half the distance of the preceding deployment. The last node device 103f may be deployed at distance L (or shorter) from the vehicle 102. Once the connection branch is established, the vehicle 102 may access Interview via the access point 512 through the node devices 103 without using cellular data.

FIG. 5C illustrates another example application 520 of the wireless communication network in which the vehicle 102 and the node devices extend the transmission range of a wireless network access point 522. In the present example, connection brand from the vehicle 102 to the last node device 103f may arranged in substantially the same manner as the application 500 illustrated with reference to FIG. 5A. The vehicle 102 may further connect to the access point 522 located a certain distance away. In the present example, the distance between the vehicle 102 and the access point 522 is about L. Therefore, the distance between the access point 522 and the last node device 103f is about 3L, effectively extending the transmission range of the access point 522 by 3L.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The words processor and processors may be interchanged herein, as may the words controller and controllers.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A wireless network having a plurality of nodes comprising:
   a main device at a starting location and configured to operate as a starting node; and
   a plurality of node devices serving as communication relays and connected in series forming a connection branch, the plurality of node devices including:
   a first node device configured to deploy to a first location at a first distance from the starting location and wirelessly connect to the main device via a first direct connection without an intermediary node in-between, and
   a second node device configured to deploy to a second location at a second distance from the first location and wirelessly connect to the first node device via a second direct connection without an intermediary node in-between, wherein the second distance is shorter than the first distance,
   wherein each node device of the plurality of node devices is provided with propulsion capability, and the main device is further configured to instruct each node device to deploy to a corresponding location.

2. The wireless network of claim 1, wherein the second distance is half of the first distance.

3. The wireless network of claim 1, wherein the plurality of node devices further include one or more subsequent node device connected in series forming an additional portion of the connection branch, wherein each subsequent serial connection has a shorter distance than a preceding connection.

4. The network of claim 3, wherein the shorter distance is half of the distance of the preceding connection.

5. The network of claim 1, wherein the main device is further configured to determine the location of each node device by at least one of: receiving location data from one or more of the node devices; or capture and analyze images of the node devices via a camera.

6. The network of claim 1, wherein at least one of the node devices is implemented as an aerial device.

7. The network of claim 1, wherein one or more of the node devices are configured to, responsive to detecting a loss of connection caused by one node device at issue, disconnect from the node device at issue and attempt to connect to a preceding node device that precedes the node device at issue.

8. The network of claim 7, wherein the one or more of the node devices are further configured responsive to inability to connect to the preceding node device, attempt to connect to a next preceding node that is further precedes the preceding node.

9. The network of claim 1, wherein one or more of the node devices are configured to, responsive to detecting a disconnection, move to a new location closer to the starting location.

10. A wireless communication system, comprising:

a plurality of node devices each serving as a node and connected in series forming a connection branch, the plurality of node devices including:

a first node device configured to deploy to a first location at a first distance from a starting location and directly wirelessly connect to a main device located at the starting location, a second node device configured to deploy to a second location at a second distance from the first location and directly wirelessly connect to the first node device, wherein the second distance is shorter than the first distance, and a third node device configured to deploy to a third location at a third distance from the second location and wirelessly connect to the second node device, wherein the third distance is shorter than the second distance, wherein each node device is integrated with an aerial device, and one or more of the node devices are configured to, responsive to detecting a loss of connection, relocate to a new location closer to the starting location.

11. The wireless communication system of claim 10, wherein the second distance is half of the first distance, and the third distance is half of the second distance.

12. The wireless communication system of claim 10, wherein each of the node devices are further configured to deploy to a corresponding location based on instructions received from the main device.

13. A vehicle comprising:

a wireless transceiver configured to communicate with one or more of a plurality of node devices provided with moving capability; and one or more controllers, programmed to:

responsive to arriving at a parking location, command a first node device of the plurality of node devices to deploy to a first location at a first distance from a parking location and directly connect to the wireless transceiver, and command a second node device of the plurality of node devices to deploy to a second location at a second distance from a first location and directly connect to the first node device, wherein the second distance is half of the first distance.

14. The vehicle of claim 13, further comprising:

a camera configured to capture images, wherein the one or more controllers are further programmed to:

monitor the locations of the first node device and second node device by analyzing the images.

15. The vehicle of claim 13, wherein the one or more controllers are further programmed to access a wide area network via the transceiver through one or more of the plurality of node devices.

16. The vehicle of claim 13, further comprising:

a wired connector configured to receive data from a wide area network, wherein the one or more controllers are further programmed to forward the data to one or more of the node devices via the transceiver.

* * * * *